Sept. 29, 1936.    R. L. SESSIONS    2,055,613
METHOD OF CHLORIDIZING ORE MATERIALS
Filed May 28, 1934
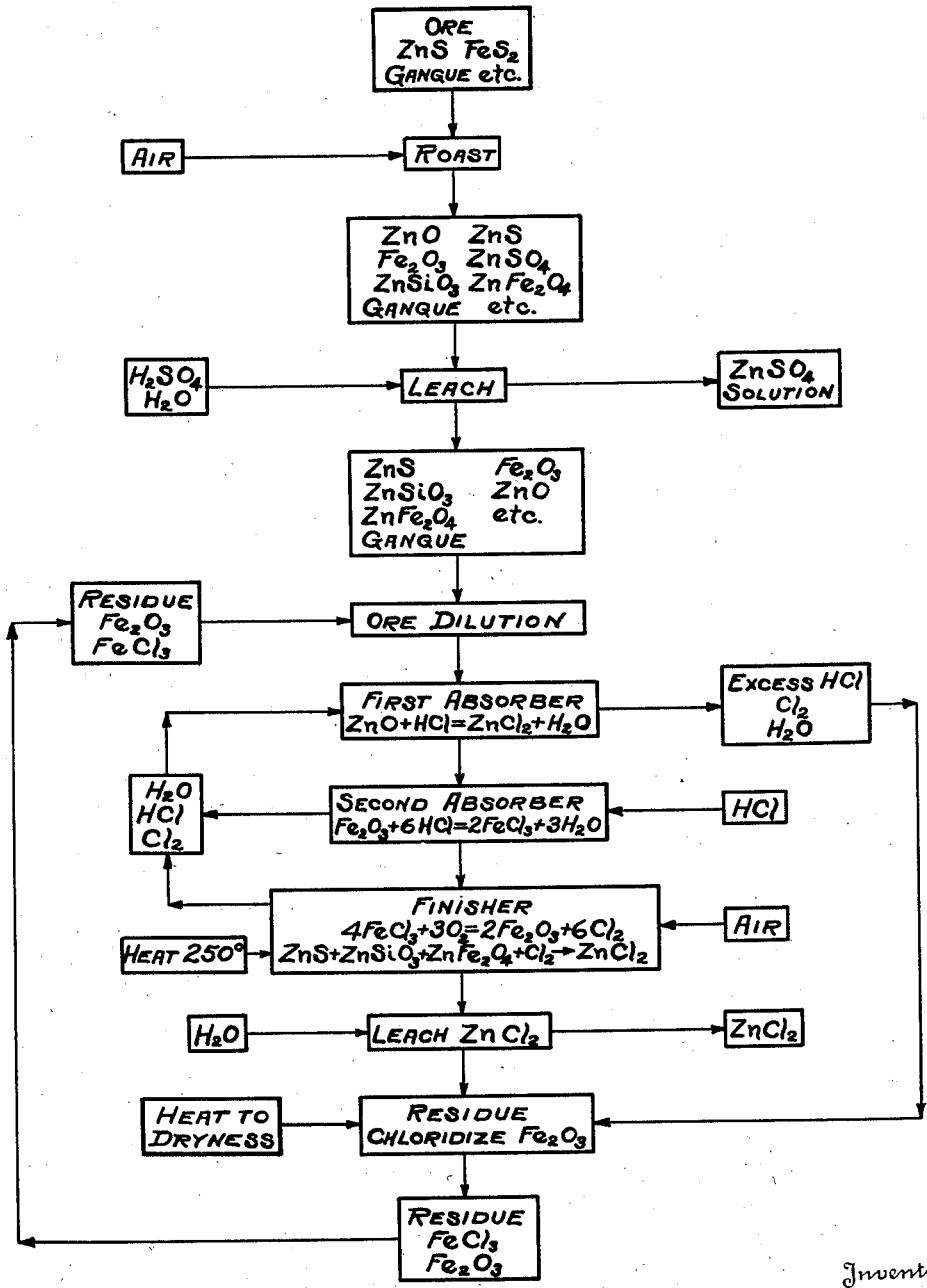
Inventor
ROYAL L. SESSIONS
By Clayton L. Jenks
Attorney Patented Sept. 29, 1936

2,055,613

UNITED STATES PATENT OFFICE 2,055,613

METHOD OF CHLORIDIZING ORE MATERIALS

Royal L. Sessions, Denver, Colo., assignor to Hughes - Mitchell Processes, Incorporated, Denver, Colo., a corporation of Wyoming Application May 28, 1934, Serial No. 727,910

11 Claims. (Cl. 75—113)

This invention relates to the chloridization of ore materials, and particularly ores containing a high content of zinc compounds, which are treated in a substantially dry condition by reagent gases.

Zinc chloride is a highly deliquescent material and tends to dissolve in any water which may be present in the reagent gas or the ore material or which may be formed during the chloridizing step, such as by the reaction of an acid gas on an ore metal oxide; and the dissolved zinc chloride tends to produce a viscous, syrupy or lumpy condition in the ore material which prevents or seriously hinders the penetration of the reagent gases. It has been proposed, in accordance with the patent to Mitchell No. 1,943,333, to roast a zinc sulfide ore, and particularly a concentrate, and then to leach some of the zinc oxide from the roasted product by means of an acid in solution, before the ore is chloridized by treatment with hydrochloric acid gas and other chloridizing reagents. It is, however, found that many zinc ores contain such a high proportion of refractory zinc compounds at the end of the roasting operation that even after such an acid leaching treatment, an abnormally high content of zinc remains. The procedure of said Mitchell patent requires the treatment of iron oxide as well as any zinc oxide present with hydrochloric acid gas which forms water of reaction, and at a later stage the water of hydration and crystallization is driven off by heat and passed over the incoming ore material. Hence, water may be present to such an extent that the zinc chloride, as it is formed, will dissolve and produce the objectionable lumpy condition and interfere with the gas penetration.

A primary object of this invention is to overcome that particular difficulty and to make it possible to chloridize a high zinc ore by an efficient, economical and rapid procedure. Other objects will be made apparent hereinafter.

In accordance with this invention, I propose to employ a finely divided zinc free ore residue, and preferably one from which all of the soluble valuable metal chlorides have been leached, to dilute the raw ore material which is to be treated, so as to provide a large amount of inert materials which will serve during the chloridizing operation to absorb the water of reaction and to separate the particles containing the zinc values and otherwise to keep them from forming the lumpy condition. As a further feature, I propose to employ the residues from a chloridizing operation which contain ferric oxide for the purpose of developing iron chloride for return to the process along with the inert gangue and thereby to add a reagent to the raw ore which is particularly effective as a chloridizer and thus hasten the chloridization of the ore values.

The chloridization process may be one of various kinds employing iron chloride as a primary reagent. This process may be carried on generally in accordance with the prior Mitchell patent, or it may be one in which ferrous chloride is employed to produce hydrochloric acid gas and/or nascent chlorine. I have illustrated diagrammatically in the accompanying drawing the applicability of this invention to the Mitchell process, but its adaptation to other chloridizing processes will be apparent in view of the following disclosure.

If the raw ore contains or has added thereto iron sulfide or iron oxide, this iron content may be employed in the chloridizing process. To that end, the sulfide ore may be roasted to produce iron oxide, and preferably ferric oxide, along with the oxides and/or sulfates of ore metals. The roasting step is preferably carried on with excess of air and under low temperature conditions such as are obtained by burning the sulfide sulfur autogenously. If a pyritic zinc sulfide is being treated, the roasted product may contain not only residual unroasted sulfides and zinc and iron oxides but also various refractory compounds of zinc, such as zinc silicate and ferrate or ferrite, which are not readily chloridized. Lead may be present as either an oxide or the sulfate. The roasted product may, if desired, be subjected to a leaching operation for the removal of the soluble compounds, such as zinc oxide and zinc sulfate, which are dissolved by means of dilute sulfuric acid to a required extent, as determined by the requirements of the later steps of the process, which is explained in the prior Mitchell patents. Thereafter the ore material may be treated in a series of apparatus, known as the first absorber, the second absorber and the finisher, as described in said patent. In the first absorber, some of the residual zinc oxide is converted to zinc chloride and the waste gases from later stages of the process are absorbed in the ore. The heat and rate of gas flow are controlled to evaporate the water of reaction to a required extent so as to keep the ore sufficiently dry to prevent the zinc chloride from dissolving in the water and forming the undesired lumpy condition.

In the second absorber, the ore material is treated with strong hydrochloric acid gas to convert iron oxide to the chloride for use in the process. If ferric oxide has been produced, a part or all of it may be chloridized. The ore may, of course, be so roasted, as by a reducing roast following an oxidizing roast, as to produce a lower oxide of iron, such as FeO or $Fe_3O_4$, and this may be converted to ferrous chloride by suitable reagents, such as hydrochloric acid and/or chlorine gas, which may be derived from later stages. Various other procedures may be adopted to this end. It is preferred, however, to employ ferric oxide and to convert it to ferric chloride in the second absorber. The temperature in the second absorber, if used, may be as high as is desired for the process. If air is present, $FeCl_3$ tends to be decomposed by heat in the vicinity of 100° C.; but if air is not present in a material amount, the temperature may be allowed to go to a much higher degree, such as 180° C., where the heat greatly aids the process.

After the ferric and/or ferrous chloride have been developed, the ore material is passed to the finisher where the chloridizing process, which is preferred, involves the conversion of the iron chloride to nascent chlorine and/or hydrochloric acid gas. This is accomplished by heating the ore material to a temperature at which the iron chloride is not stable in the presence of oxygen, with the resultant decomposition of the iron chloride to ferrous oxide and chlorine. In the presence of a material amount of water vapor, the chlorine will form hydrochloric acid gas. In the absence of water vapor, the reagent will be nascent chlorine. This reaction is preferably accomplished in accordance with said Mitchell patent, in which case air is passed as a countercurrent over the ore material, thus removing the water vapor from the ore entrance end of the casing and causing nascent chlorine to be developed from the ferrous and ferric chlorides present in the ore material. This chloridizing gas is passed through the porous granular ore material and there converts the residual zinc sulfide, as well as the refractory silicate, ferrite etc. to zinc chloride. The chloridizing, as well as the roasting operation may be carried on in the presence of alkaline earth material, as described in the Mitchell patent, if desired.

The operation of heating the ore material in the finisher to 250° C. or higher in the presence of an excess of air results in conversion of ferrous oxide to ferric oxide and produces a finely divided ore residue containing the ferric oxide intermixed with soluble ore metal chlorides. These chlorides may be leached from the residue by suitable operations. For example, zinc chloride will be dissolved by water; lead chloride and lead sulfate will be dissolved by a hot sodium chloride solution. After the values have been taken from the ore material, the residue then consists of the finely divided gangue together with calcium sulfate, if present, and ferric oxide.

If a high zinc ore is being treated, such as a concentrate which contains but little gangue, the ore values are not sufficiently separated in a physical sense to prevent interreactions or deleterious results due to the presence of water. It is accordingly desirable, for certain types of ores, to dilute the ore material with inerts which physically separate the particles of zinc and other metal values and which have the capacity of absorbing water of reaction and keeping the ore substantially dry. The finisher material, after the values have been leached therefrom, is particularly suited for this purpose. Hence, a desired portion of the wet material may be dried to remove the water therefrom and then returned to one of the absorbers or the finisher. This added finisher material makes a low grade ore, as it were, of the ore material in the absorbers; and when the high content of zinc sulfide, silicate, etc. is chloridized by the chlorine in the finisher or by direct reaction with ferric chloride in the second absorber, there is a large amount of inert material present which takes up water of reaction, however developed, and keeps the ore dry. Also, the zinc chloride and other valuable compounds are physically held apart and the reactions are compelled to take place in isolated or separated particles. Hence, even if considerable water is developed by the reaction of hydrochloric acid on the zinc and iron oxides present or is released from the hydrated crystalline iron chloride when heated in the finisher, yet the zinc chloride cannot form the syrupy or lumpy condition. This return of inert materials, therefore, serves a useful purpose.

A further feature of this invention involves the chloridization of the iron oxide in this residue, so that when the inerts are returned to a primary chloridizing process, there will be a primary chloridizing reagent included therein. This is preferably accomplished by passing the waste gases from the chloridizing steps over the residue material, which may be either wet or dry, and thus causing the iron oxide to be converted to a chloride. Hydrochloric acid gas and chlorine derived from other sources may be employed for this purpose and other reagents may be likewise adopted. It is not necessary in many cases to chloridize all of the iron oxide, but only sufficient to insure that a high content of ferric and/or ferrous chloride is present in the ore material during the treatment thereof. In the process illustrated in the drawing, the excess of chlorine and hydrochloric acid gas, as well as water vapor, is by-passed from the finisher to the first absorber and does not enter the second absorber, where the hydrochloric acid gas should be used in high concentration, and the excess of the latter and included water vapor is likewise passed to the first absorber. The excess of these gases is then passed to a tower or tube where the finisher residue, after leaching, is treated therewith, and preferably after removal of the water. The residue may be lifted by baffles in a rotary tube and showered through the gas, or they may be caused to fall by gravity over baffles in a tower, where they meet the reagent gas. Various other methods within the knowledge of workers in this field may likewise be employed.

Consequently, the ore residue is employed for a double purpose. First, it serves to dilute a concentrated ore and permit it to be chloridized by a process which is particularly efficient for low grade ores; and second, it has served to return some of the iron formerly used as a reagent for cyclic use in the process. This second function serves to provide a high concentration of ferric chloride in finely divided condition in intimate association with the difficultly chloridized refractory compounds, and because of this preponderance of reagent, the chloridization of these values is particularly efficient.

The order of the steps above described may be so arranged that the ore material goes directly from the first absorber to the finisher, if it is not necessary to make more $FeCl_3$. In any case, the ferric chloride added to the ore as well as that formed in the second absorber, serves first to react directly with zinc sulfide etc. and be reduced to ferrous chloride, after which the iron chlorides are decomposed by heat to form nascent chlorine and/or hydrochloric acid gas. It may also be desirable to treat the finisher residues with strong HCl gas, but preferably this is accomplished by means of the waste gases. It is also feasible to add the unchloridized residues, whether dry or wet, to the first absorber material and allow the warm chloridizing gases therein to dry out the water, after which the ferric oxide is converted to ferric chloride in the second absorber. If the residues are chloridized and dried before introduction to the absorbers, they will not carry water thereto; and, of more importance, the dry ferric chloride will react with the zinc sulfide and other refractory values and convert them to chlorides without forming water. This is desirable because successful chloridization of a zinc concentrate requires the elimination of water.

It is to be understood that, in the first absorber, the temperature may be high enough, and preferably above 80° C. but below the melting point of zinc chloride, and the rates of ore and gas flow therethrough are so regulated that enough water is evaporated and carried away on the countercurrent gas flow so that the ore material is kept in a substantially dry condition, although some water may be present. It is also to be understood that only a part, or all of the iron oxide may be chloridized before the residue is returned to dilute the ore of a high content of refractory zinc compounds, as will be determined by the requirements of the process. Ordinarily, I return a finely divided intermixture of both iron oxide and iron chloride along with the inert materials. The iron oxide thus returned may be chloridized in the second absorber, but in many cases it is not necessary to convert all of the iron oxide there present to a chloride. The iron oxide in that case serves admirably as a diluting agent, along with the gangue and other materials, such as calcium sulfate, which make up the residue.

If the finisher residue is to be treated in a dry condition, this may be done by heating the leached product to dryness before introducing the waste gases; or the drying and chloridizing steps may be carried on simultaneously, just as in the first absorber. This is accomplished by passing the gases over the residue in a counterflow relation and maintaining a temperature of 80° C. or higher. The rate of gas flow and the temperature are so regulated as to evaporate and remove sufficient water to dry the residue.

Having thus described my invention, what I claim as new and desire to secure by Letters Patent is:

1. The method of chloridizing a roasted sulfide ore containing a high content of a chloridizable zinc compound comprising the steps of mixing the roasted ore in a finely divided condition with an ore gangue containing a large content of inert material and iron oxide which is proportioned for absorbing sufficient water to keep the ore material substantially dry during its chloridization and thereby providing an ore material having a low zinc content, thereafter treating the mixture at a temperature below 100° C. with a chloridizing gas containing hydrochloric acid which reacts with a metal oxide to form water, and maintaining the ore in a substantially dry condition while converting the iron oxide to iron chloride in situ, and causing said iron chloride to chloridize said zinc compound.

2. The method of chloridizing an ore material containing a high content of chloridizable zinc compounds comprising the steps of providing an intimate mixture of the ore material in finely divided condition with iron chloride and inert materials added to provide a chloridizing agent and to dilute the ore material to a low grade, heating the mixture with air to a temperature at which the iron chloride is not stable and developing iron oxide therein and a gaseous reagent which chloridizes an ore metal value, removing the soluble metal chlorides and providing a zinc free residue containing iron oxide, and returning some of the ore residue with its iron oxide for diluting a second batch of ore material prior to another chloridization step.

3. The method of chloridizing an ore material having a high content of chloridizable zinc compounds, comprising the steps of diluting the ore material by intermixing it with a residue from a previous operation which contains iron oxide, treating the mixture with a chloridizing agent comprising hydrochloric acid gas and forming iron chloride in situ at a temperature below 100° C. while maintaining the ore material in a substantially dry condition, thereafter heating the material with air to a temperature at which the iron chloride is not stable and forming ferric oxide and a chloridizing gaseous reagent, causing said reagent to chloridize ore values within the material, then leaching the soluble metal chlorides from the ore material and providing an ore residue containing ferric oxide, and returning a portion of said residue for diluting a further batch of ore material and providing iron oxide for development of said iron chloride therein.

4. The method of chloridizing an ore material containing a chloridizable zinc compound comprising the steps of treating the ore material in a substantially dry condition and in the presence of iron oxide with chloridizing agents to form zinc chloride and ultimately heating the material and producing an ore residue containing ferric oxide, removing the soluble zinc chloride therefrom, treating the residue with a chloridizing agent and converting ferric oxide therein to ferric chloride, and returning the residue, including the ferric chloride, for intermixture with further ore material and causing the chloridization of ore metal values thereby.

5. The method of chloridizing an ore material containing chloridizable zinc compounds comprising the steps of diluting the ore by means of an ore residue containing a large amount of inert material and iron chloride, heating the mixture with an oxidizing agent to a temperature at which the iron chloride is dissociated with the formation of a chloridizing gas and iron oxide, separating the zinc chloride from the residue, thereafter treating a portion of the residue containing said iron oxide with a chloridizing agent to form iron chloride therein and returning the treated residue containing the iron chloride for intermixture with further ore material to be diluted and chloridized.

6. The method of treating an ore material containing a high content of chloridizable zinc compounds comprising the steps of diluting the ore material with an inert material which is capable of and is proportioned for absorbing water and preventing the formation by the deliquescent zinc chloride of a lumpy mass which is not readily penetrated by fluids, and treating the ore material with a chloridizing reagent which contains or develops water during the process, whereby the inert material takes up the water and causes the zinc compounds to be chloridized in separated and isolated particles by the chloridizing reagent.

7. The method of treating an ore material containing a high content of chloridizable zinc compounds comprising the steps of diluting the ore material with a residue containing ferric oxide derived from a previous chloridizing operation which is capable of and proportioned for absorbing sufficient water to keep the ore material substantially dry during the following chloridizing step, treating the intermixture in finely divided and substantially dry condition with a chloridizing agent which contains or forms water so as to convert the iron oxide to a chloride while maintaining the ore material porous and gas permeable, heating the intermixture with air to a temperature at which the iron chloride is not stable and forming iron oxide and a chloridizing gas therefrom, and thereafter leaching out the soluble zinc chloride and providing a residue containing iron oxide for re-use in the process.

8. The method of treating an ore material having a high content of chloridizable zinc compounds comprising the steps of providing an intimate finely divided mixture of said ore material with an ore residue containing iron chloride, thereafter heating the ore material with air to a temperature at which the iron chloride is not stable and forming iron oxide and a chloridizing gas therefrom, leaching the soluble zinc chloride from the residue, treating the residue with a chloridizing reagent to convert iron oxide therein to a chloride for re-use in the process, and returning a portion of the residue for intermixture with another batch of ore material.

9. The method of treating an ore material containing a high content of chloridizable zinc compounds comprising the steps of mixing the ore material in a finely divided condition with an ore residue containing ferric oxide and ferric chloride, causing a chloridization of the zinc compounds by reaction with said ferric chloride, heating the ore material with oxygen to a temperature at which the iron chlorides are not stable and forming ferric oxide and a chloridizing gaseous reagent for further chloridizing said compounds, leaching out the zinc chloride, thereafter treating the residue with a chloridizing agent to convert the ferric oxide to ferric chloride for return to the process, and returning a portion of the residue for intermixture with another batch of ore material.

10. The method of claim 9 in which the residue is dried and chloridized to form iron chloride after leaching out the zinc chloride so that a substantially dry material is returned to process and the reaction of the zinc compounds and ferric chloride takes place in the absence of any large amount of water.

11. The method of chloridizing a zinc sulfide ore comprising the steps of first roasting the ore in intimate mixture with iron sulfide to form ferric oxide, zinc oxide and various other zinc compounds, leaching a soluble zinc compound from the roasted ore and thereafter chloridizing the residue in accordance with the method of claim 9.

ROYAL L. SESSIONS.